United States Patent [19]

Boschet

[11] 4,171,905

[45] Oct. 23, 1979

[54] DEVICE FOR ILLUMINATING AND ADJUSTING THE AMOUNT OF LIGHT IN MACHINES FOR ELECTROSTATICALLY PREPARING PRINTING MATRICES

[75] Inventor: Vittorino Boschet, Milan, Italy

[73] Assignee: Grafosol S.p.A., Italy

[21] Appl. No.: 872,488

[22] Filed: Jan. 26, 1978

[30] Foreign Application Priority Data

Feb. 2, 1977 [IT] Italy .............................. 19874 A/77

[51] Int. Cl.² ........................................... G03B 27/76
[52] U.S. Cl. ..................................... 355/71; 355/3 R; 355/50
[58] Field of Search ...................... 355/3 R, 8, 11, 50, 355/51, 71, 65, 66

[56] References Cited

U.S. PATENT DOCUMENTS

| | | | |
|---|---|---|---|
| 3,981,577 | 9/1976 | Tsilibes | 355/71 X |
| 4,068,948 | 1/1978 | Ritzerfeld | 355/71 X |

Primary Examiner—Richard A. Wintercorn
Attorney, Agent, or Firm—Steinberg & Blake

[57] ABSTRACT

Device for illuminating and adjusting the amount of light in machines for electrostatically preparing printing matrices, wherein at least one pair of light sources are arranged on a driven carriage, also carrying a selectively shaped diaphragm, the aperture of which varies as a function of the carriage position.

4 Claims, 3 Drawing Figures

DEVICE FOR ILLUMINATING AND ADJUSTING THE AMOUNT OF LIGHT IN MACHINES FOR ELECTROSTATICALLY PREPARING PRINTING MATRICES

This invention relates to a device intended to be used in machines for electrostatically preparing printing matrices and the function of which is to illuminate the original (drawing, writing or the like) which is to be reproduced on the matrix, and selectively adjust the amount of light reaching the matrix, so as to render as uniform as possible the amount of light reaching each surface unit of the matrix.

Machines for electrostatic preparation of matrices are well known in the most different implementations. Generally, such machines comprise two or more light sources for illumination of the original to be reproduced, a lens (and possible prism or mirror), a means for supporting the (paper or metal) matrix at exposure position, a device for electrostatically charging the matrix, a device for developing the latent image appearing on the matrix by means of a suitable toner, and a baking device for fixing the image.

Satisfactory matrices are provided by conventional machines, but not unexceptionable as to quality of the image being printed by the matrix. On one hand, this is due to the generation, when the original is an assembly (that is comprising a base original having parts superimposed thereto and partially covering it), of shadow areas appearing as lines, points or marks on the matrix; and on the other hand because of the central matrix area receiving a larger amount of light than the surrounding areas.

Therefore, it is the primary object of the present invention to provide a device to obviate the above mentioned disadvantages, as allowing to avoid shadow areas and an uneven distribution of the amount of light on the matrix.

A device according to the invention is characterized in that at least one pair of light sources are arranged in a driven carriage, which also carries a selectively shaped diaphragm, the aperture of which varies as a function of the carriage position.

The invention will be more clearly understood from the following detailed description given by mere way of unrestrictive example of a preferred embodiment thereof, as shown in the accompanying drawings, in which.

Figure 1:
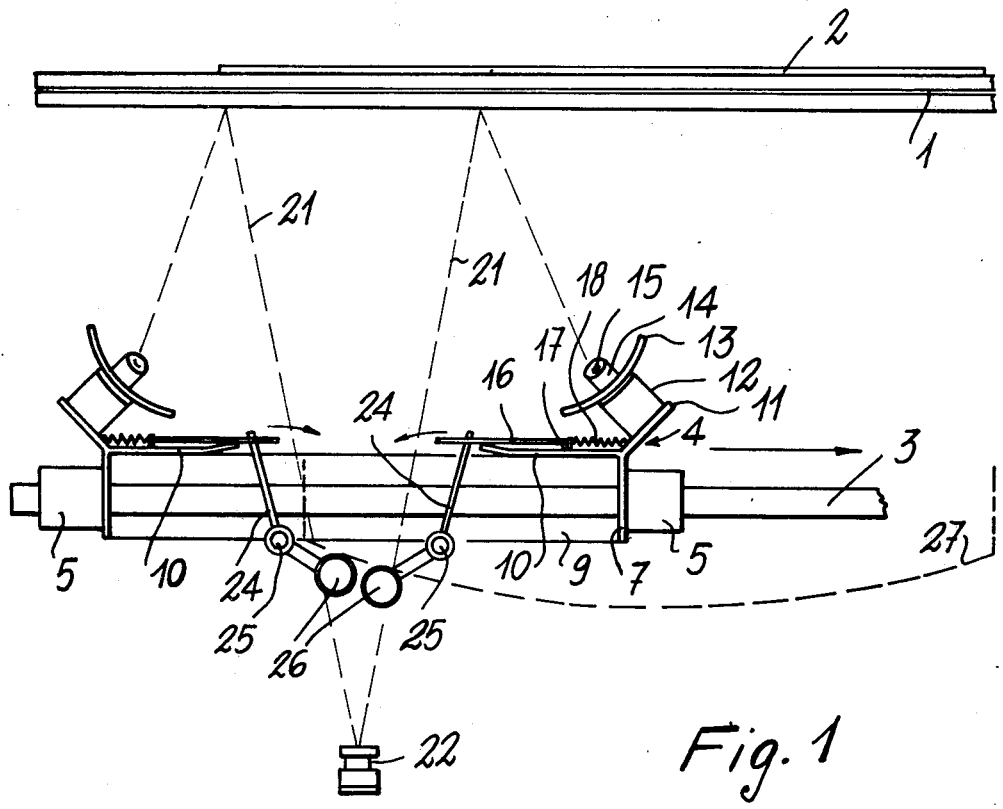
FIG. 1 is a side elevational view schematically showing the device of the invention.
Figure 2:
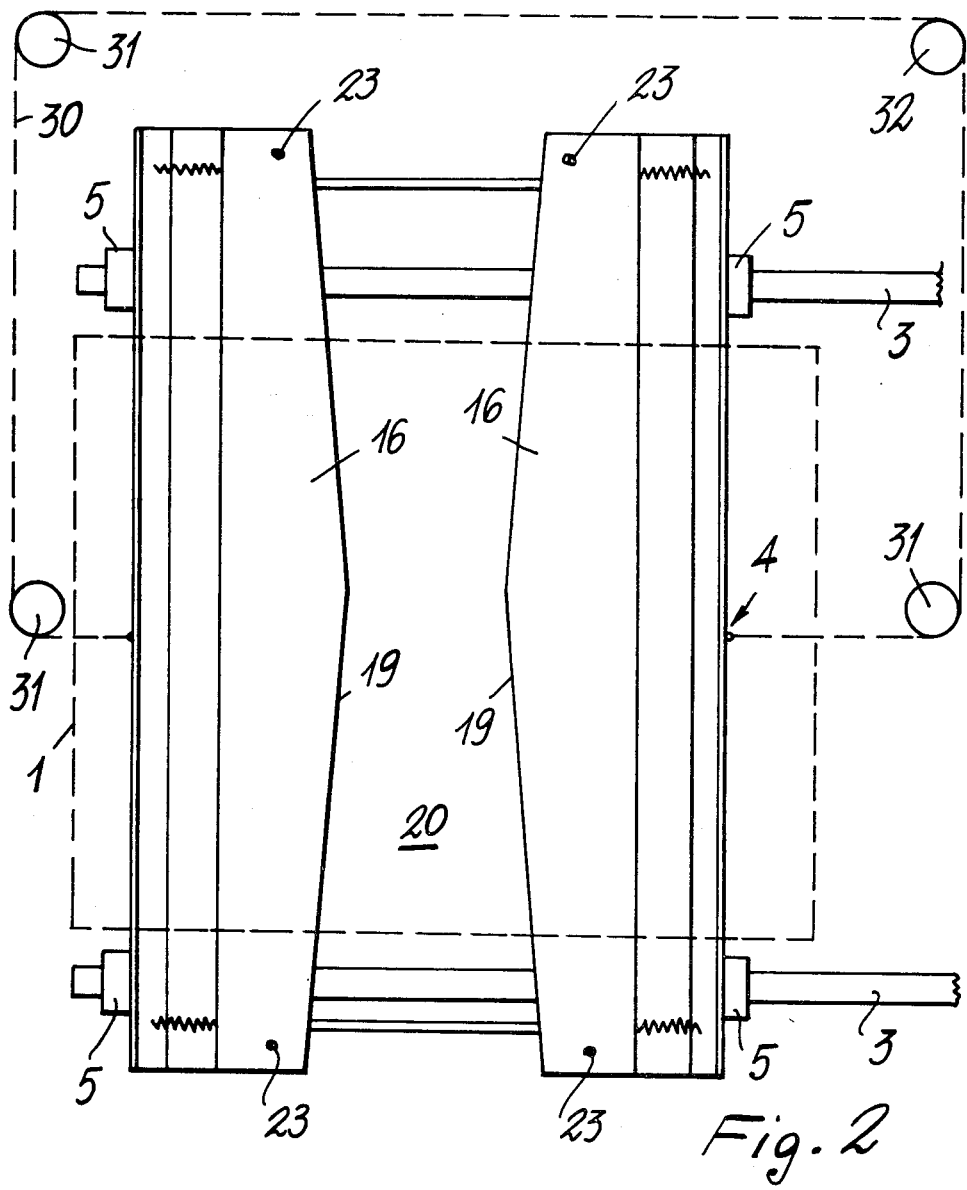
FIG. 2 is a top view of the device at one of its positions, with some parts being omitted for simplicity.

Referring to the figures of the accompanying drawings, reference numeral 1 designates a horizontal glass plate, on which an original 2 is laid facing downwardly. Two parallel guide rods 3 are placed below said plate and secured at the ends thereof to the machine framework, not shown, in any known manner. By means of bush bearings 5, a carriage 4 is slidably mounted on said two rods.

Carriage 4 includes a substantially rectangular frame, that is comprising two vertical heads 6 and 7 and two vertical sides 8 and 9 orthogonal to the former. At the top said two heads 6 and 7 have a horizontal section 10, the end of which is somewhat inclined relative to the horizontal, and laterally an inclined branch 11, on which a reflective parabola 13 is supported, as well as caps or bases 14 for support and supply of a tubular lamp 15.

On each of said horizontal sections 10 a lamination 16 is laid and provided with a square bent edge 17, against which traction springs 18 are operative and secured in any known manner, such as hooked or coupled in holes, at one end to edge 17 and at the other end to branch 11.

The facing edges 19 of laminations 16 are shaped as shown, that is substantially V-shaped, so as to define together an opening or passage 20, which is narrower at the center, and through which the light rays 21 pass from the original and are directly or indirectly collected by a lens 22, therefrom reaching the matrix, not shown.

Said two laminations 16 make up the diaphragm allowing to selectively adjust the amount of light reaching the matrix.

Figure 3:
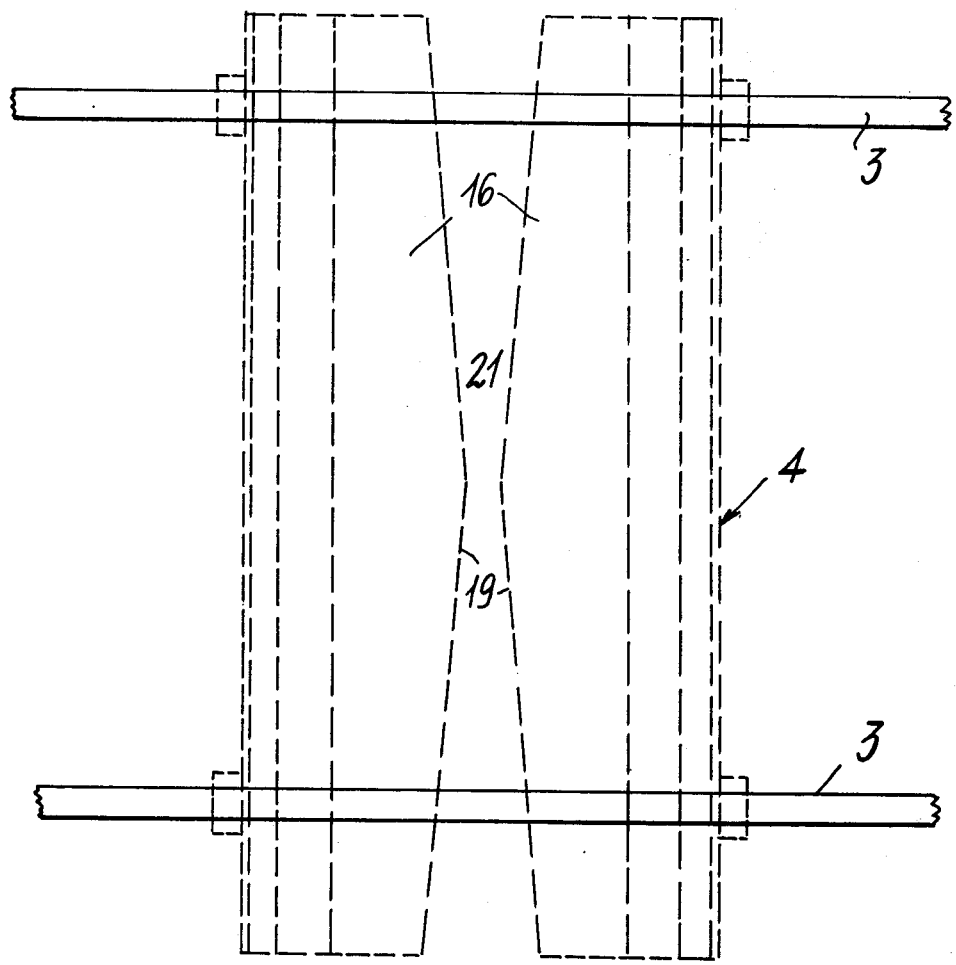
FIG. 3 is a view similar to that of FIG. 2, but at another position.

At the side ends of laminations 16 provision is made for holes 23. Such holes are penetrated by the ends of levers 24 which are hinged or pivoted at 25 to said sides 8 and 9. That is, two pairs of levers are provided, of which one pair pivoted to side 8, and the other to side 9. The other ends of levers 24 are provided with rollers 26 retained in contact with laminations 27 (shown in phantom) by said springs 18. Shaping of laminations or cams 27 is such that, when carriage is at the center of the original, such two laminations 16 are at the position of closest proximity (see FIG. 3), and when the carriage is at the side ends of the original, said two laminations 16 are at a larger spacing or distance from each other.

At the other positions of said carriage, the laminations would assume intermediate distances.

Therefore, it is apparent that at any position of the carriage, said aperture or passage 20 is narrower at the center than at the edges (owing to shaping of edges 19) and the extension of aperture or passage 20 varies as a function of the carriage position, and is minimal at central position and maximum at the positions of its end of stroke. As a result of this expedient, each of the surface units of the matrix substantially receive the same amount of light. Additionally, due to the provision of two spaced apart lamps 15 having reflecting parabolas 13 with convergently arranged optical axes, the shadow areas are avoided in case of assemblies.

For operation of carriage 4, a chain transmission could be provided, wherein the chain ends are secured or attached to the carriage and the chain passes on idle wheels 31 and on a drive wheel 32 operated by a geared motor of reversible direction of rotation.

When the machine is operated, lamps 15 are lit up and carriage 4 moves in one direction; on arriving at end of stroke, it reverses its motion by contact with a microswitch, not shown, and the lamps are extinguished; on returning to start position, the carriage stops by contact with a further microswitch, also not shown.

Although only one embodiment of the invention has been described, those skilled in the art can now readily devise many changes and modifications, which however are to be intended as within the scope of the present invention.

What is claimed is:

1. A device for illuminating and adjusting the amount of light in machines for electrostatically preparing printing matrices, comprising:
    a carriage mounted for driven movement to scan an object;

at least one pair of light sources mounted on said driven carriage;

means carried by said driven carriage for defining a selectively shaped diaphragm having an aperture; and means for varying the size of said diaphragm aperture during the scanning movement of said carriage, the size of the aperture being a function of the position of said carriage relative to said object during a scanning movement.

2. A device according to claim 1, wherein said diaphragm defining means comprises a pair of opposed laminations mounted on said carriage, said laminations being each movable against springs and having a substantially V shape on the respective opposing edge thereof.

3. A device according to claim 1, wherein the aperture size varying means comprise cam members and means for operatively associating said laminations and said cam members in a manner such that when the carriage scans the substantial center of the object, the aperture is in the minimal light transmitting configuration, and when the carriage scans the ends of the object, the aperture is in the maximum light transmitting configuration.

4. A device according to claim 1, wherein the light sources are associated with reflective parabolas having convergent optical axes.

* * * * *